(12) United States Patent
Rahul U et al.

(10) Patent No.: US 10,572,962 B2
(45) Date of Patent: Feb. 25, 2020

(54) GENERATING AN INCIDENT DOSSIER

(71) Applicant: Honeywell International Inc., Morristown, NJ (US)

(72) Inventors: Anantha Padmanabha Rahul U, Bangalore (IN); Jagmeet Puri, Bangalore (IN); Magesh Lingan, Bangalore (IN); Alok Mishra, Mangalore (IN); Naveen Prabhu, Bangalore (IN); Ronita De, Bangalore (IN)

(73) Assignee: Honeywell International Inc., Morris Plains, NJ (US)

(*) Notice: Subject to any disclaimer, the term of this patent is extended or adjusted under 35 U.S.C. 154(b) by 386 days.

(21) Appl. No.: 14/847,715

(22) Filed: Sep. 8, 2015

(65) Prior Publication Data
US 2017/0068422 A1 Mar. 9, 2017

(51) Int. Cl.
*G06Q 50/26* (2012.01)
*G06F 16/44* (2019.01)

(52) U.S. Cl.
CPC .......... *G06Q 50/265* (2013.01); *G06F 16/44* (2019.01)

(58) Field of Classification Search
CPC ....... G06Q 10/00; G06Q 50/265; G06F 16/44
See application file for complete search history.

(56) References Cited

U.S. PATENT DOCUMENTS

| 5,951,485 | A  | * | 9/1999  | Cyrus    | G01D 3/02 600/523 |
| 8,332,767 | B1 | * | 12/2012 | Beil     | G06F 17/30265 715/230 |
| 8,566,136 | B2 | * | 10/2013 | Richter  | G06Q 10/06 705/7.17 |
| 8,874,071 | B2 | * | 10/2014 | Sherman  | H04W 4/22 455/404.1 |
| 9,640,068 | B2 | * | 5/2017  | Greene   | G08C 19/00 |
| 9,760,613 | B2 | * | 9/2017  | Choudhary | G06F 16/248 |
| 2002/0083024 | A1 |  | 6/2002  | Myers    |    |
| 2002/0143595 | A1 |  | 10/2002 | Frank et al. |  |
| 2008/0071717 | A1 |  | 3/2008  | Nisani   |    |
| 2009/0251545 | A1 | * | 10/2009 | Shekarri | G06Q 10/00 348/158 |
| 2013/0039634 | A1 |  | 2/2013  | M        |    |

(Continued)

OTHER PUBLICATIONS

Andreas Girgensohn, et al. "DOTS: Support for Effective Video Surveillance". MULTIMEDIA '07 Proceedings of the 15th international conference on Multimedia. Germany. Sep. 23-28, 2007. pp. 423-432.

*Primary Examiner* — Alvin H Tan
(74) *Attorney, Agent, or Firm* — Seager Tufte & Wickhem LLP

(57) ABSTRACT

Methods, devices, and systems for generating an incident dossier are described herein. One device includes a memory, and a processor configured to execute executable instructions stored in the memory to import data associated with an incident associated with a site, wherein the data is in a number of different forms, receive a number of user inputs associated with the incident, and generate an incident dossier based on the data associated with the incident and the number of user inputs, wherein the incident dossier includes a timeline of the incident, a report of the incident, and a damage assessment of the incident.

17 Claims, 5 Drawing Sheets

(56) References Cited

U.S. PATENT DOCUMENTS

| | | | |
|---|---|---|---|
| 2013/0145270 A1 | 6/2013 | Piran et al. | |
| 2014/0280584 A1* | 9/2014 | Ervine | H04L 65/403 |
| | | | 709/204 |
| 2015/0168144 A1* | 6/2015 | Barton | G01C 11/02 |
| | | | 348/144 |
| 2016/0335596 A1* | 11/2016 | Richie | G06Q 10/10 |

* cited by examiner

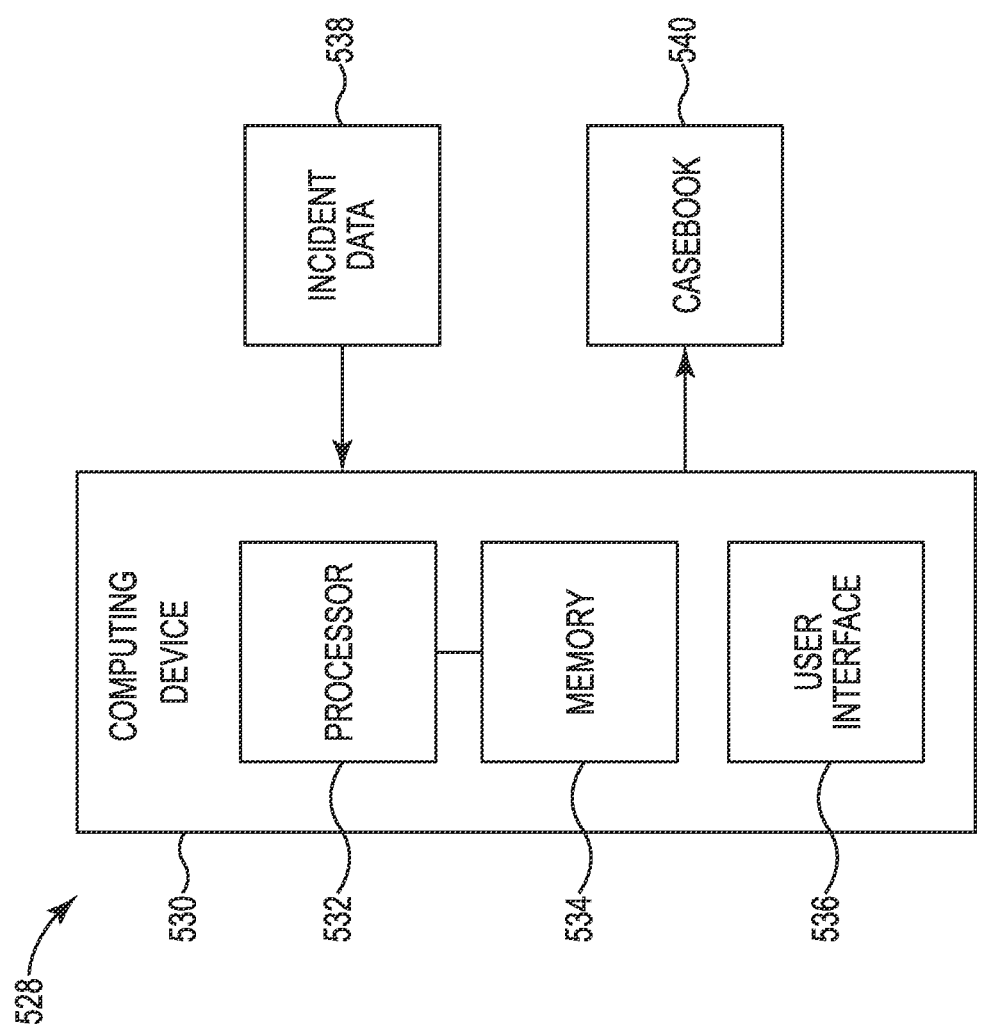

GENERATING AN INCIDENT DOSSIER

TECHNICAL FIELD

The present disclosure relates to methods, devices, and systems for generating an incident dossier.

BACKGROUND

Incidents such as burglaries, fires, and/or slip-and-falls can occur at or within buildings at any time. It can be important, for incident reconstruction purposes, to quickly ascertain what, where, and when the incident occurred, as well as what response to the incident was undertaken. For example, if a fire occurred on an upper floor of a building, it can be crucial to understand where and when the fire occurred, as well as why it occurred. This information can be vital in understanding how to prevent future incidents, how to improve on responses to such incidents if they occur again, and any liability issues that may arise if any injuries occurred as a result of the incident.

However, current systems for incident reconstruction suffer from various drawbacks. For example, current systems do not provide a way to quickly gain a complete view of incidents. Further, quick damage assessment can be difficult because of a lack of understanding of the details surrounding the incident. Additionally, repairs that may need to be made to the building as a result of the incident may be delayed.

Additionally, current systems for incident reconstruction may not be able to combine data from various building systems. For example, evidence of an incident included in a building video management system, alarm management system, fire management systems, and/or other building management systems may need to be manually searched for data relating to the incident. A manual search can be can be a time consuming and/or expensive process.

Further, multiple personnel may be involved in response to an incident. It can be difficult to collect and/or log each person's actions in response to an incident.

BRIEF DESCRIPTION OF THE DRAWINGS

FIG. 5 is a system for generating an incident dossier, in accordance with one or more embodiments of the present disclosure.

DETAILED DESCRIPTION

Figure 1:
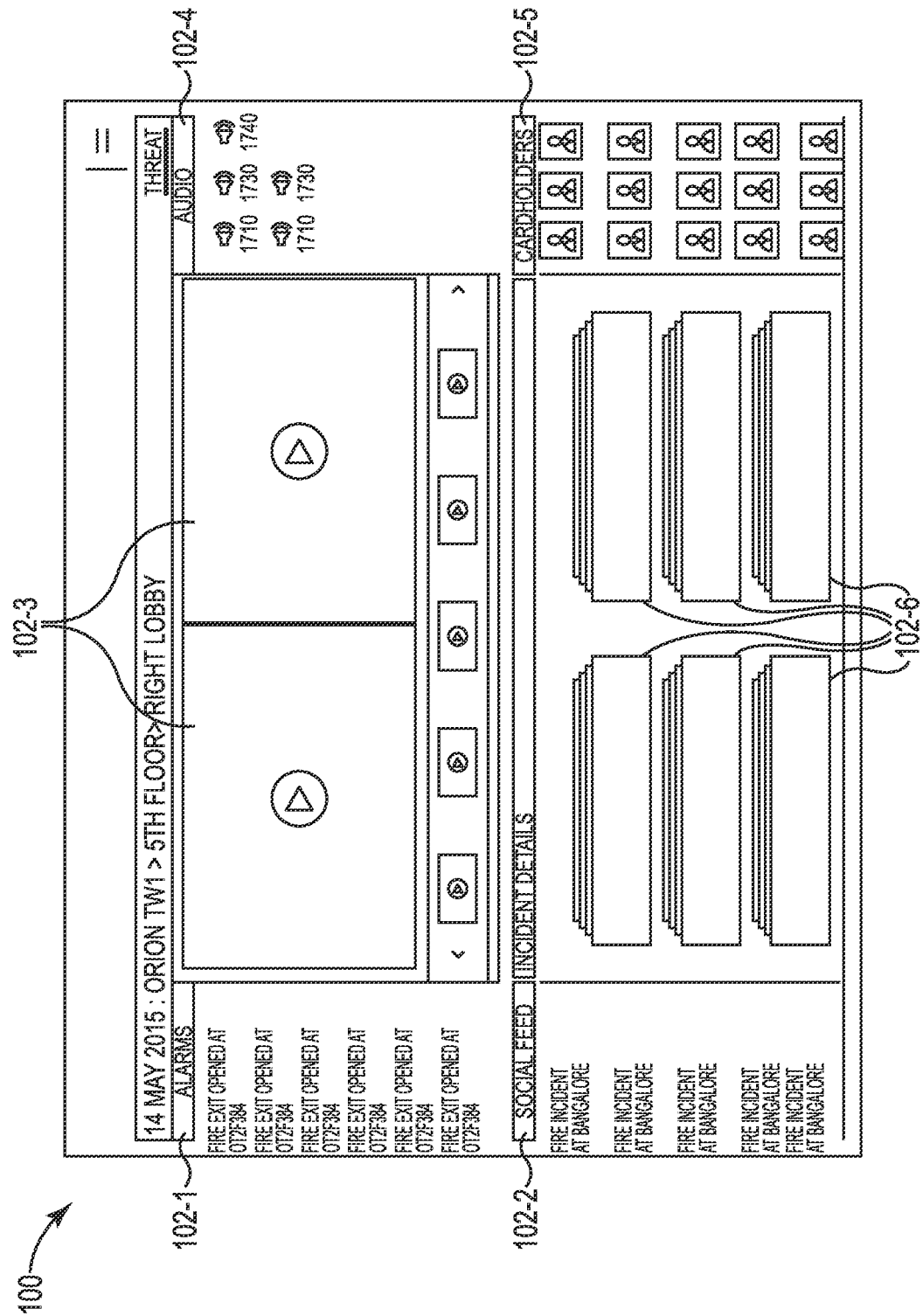
FIG. 1 is an illustration of a display on a user interface showing an incident dossier interface, generated in accordance with one or more embodiments of the present disclosure.

Methods, devices, and systems for generating an incident dossier are described herein. For example, one or more embodiments include a memory, and a processor configured to execute executable instructions stored in the memory to import data associated with an incident associated with a site, wherein the data is in a number of different forms, receive a number of user inputs associated with the incident, and generate an incident dossier based on the data associated with the incident and the number of user inputs, wherein the incident dossier includes a timeline of the incident, a report of the incident, and a damage assessment of the incident.

Generating an incident dossier, in accordance with the present disclosure, can allow a user to quickly gain a complete view of an incident that has occurred by automatically aggregating data associated with the incident from various systems. Automatic aggregation of data from various building systems can greatly reduce the amount of time required in reconstructing an incident. This information can be crucial in responding quickly to an incident for damage assessment of a building and/or liability issues relating to the incident. Additionally, this information can allow personnel associated with incident response to review response procedures to enable more efficient responses to future incidents, and/or apply fixes to ensure a similar incident does not occur in the future.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing.

As used herein, "a" or "a number of" something can refer to one or more such things. For example, "a number of alarms" can refer to one or more alarms.

FIG. 1 is an illustration of a display on a user interface (e.g., user interface 536, as described in connection with FIG. 5) showing an incident dossier 100, generated in accordance with one or more embodiments of the present disclosure. As shown in FIG. 1, the incident dossier 100 can include data 102-1, 102-2, 102-3, 102-4, 102-5, and 102-6 associated with an incident.

Incident dossier 100 can be generated by a computing device (e.g., computing device 530 as described in connection with FIG. 5) by importing data (e.g., data 102-1, 102-2, 102-3, 102-4, 102-5, and 102-6, as shown in FIG. 1) associated with an incident associated with a site, receiving a number of user inputs associated with the incident, generating a timeline (e.g., timeline 204 described in connection with FIG. 2) of the incident, determining a critical section on the timeline of the incident as will be further described herein (e.g., in connection with FIG. 2), and generating incident dossier 100 based on the data associated with the incident and the number of user inputs. The data can include a number of different forms of data, as will be further described herein.

As used herein, an incident can refer to one or more events that occur at a site that may be associated with various forms of data. For example, an incident can be a burglary, and a number of door breakages can be events associated with the burglary. As another example, an incident can be a fire that has occurred, and a number of alarms can be events associated with the fire.

As used herein, a site can refer to a location where an incident has occurred. For example, a fire can occur in a server room of a building. The incident can be the fire that has occurred, whereas the site of the incident can be the server room of the building.

After an incident has occurred, data can be automatically associated with the incident. For example, after a burglary has occurred, data related to the burglary can be automatically associated with the burglary.

As shown in FIG. 1, incident dossier 100 can include multiple forms of data associated with an incident. That is, incident dossier 100 can be generated based on multiple forms of data associated with the incident. For example, incident dossier 100 can include alarm data 102-1, social media data 102-2, video data 102-3, audio data 102-4, cardholder data 102-5, and incident detail data 102-6.

Alarm data 102-1 can include alarms associated with an event that occurs in a building. For example, alarm data 102-1 can include information relating to the type of alarm, such as a fire alarm that has been activated, an alarm indicating an emergency exit door has been opened, an alarm indicating a building access point such as a window or door has been broken, and/or any other type of alarm included as part of an alarm system of a building. Additionally, alarm data 102-1 can include other information such as the location of the alarm, the severity level of the alarm, or any other type of alarm information that may be relevant to incident dossier 100.

Alarm data 102-1 can be imported from a building alarm management system. For example, a building alarm management system can include one or more sensors. Importing alarm data 102-1 can include importing sensor data relating to an incident.

Although importing alarm data 102-1 is described as being imported from a building management system, embodiments of the present disclosure are not so limited. For example, alarm data 102-1 can be imported from any other type of source. Additionally, although alarm data 102-1 is described as including sensor data, embodiments of the present disclosure are not so limited. For example, alarm data 102-1 can include data from any other type of alarm.

Social media data 102-2 can include social media content uploaded by visitors to a building that might relate to an incident. Social media content from social media platforms (e.g., Facebook, Twitter, Instagram, and/or any other social media platform) can be searched for content uploaded by users that were in proximity to or within the building at a time an incident occurred that might be related to the incident. For example, a Facebook user may have taken and uploaded a picture that has captured details relating to an incident; the picture the Facebook user has uploaded can be included in incident dossier 100. As another example, a Twitter user's Tweets about an incident that has occurred may be included in incident dossier 100.

Although social media data 102-2 is described as including social media content from Facebook, Twitter, and/or Instagram users, embodiments of the present disclosure are not so limited. For example, any other social media content from any other social media platform that may be relevant to an incident can be included in incident dossier 100.

Video data 102-3 can include recorded video footage relating to an incident. For example, a building may have a number of security cameras that may have captured footage relating to an incident. The security camera footage of the incident can be included in video data 102-3 as part of incident dossier 100.

Video data 102-3 can be imported from a building video management system that can include security cameras recording video footage. For example, importing video footage can include importing video footage recorded by security cameras in proximity to an incident. Importing video footage can further include trimming the length of the video footage so as show an incident and/or events relevant to (e.g., events leading up to, and/or events caused by) the incident.

Although importing video data 102-3 is described as being imported from a building management system, embodiments of the present disclosure are not so limited. For example, video data 102-3 can be imported from any other type of source. Additionally, although video data 102-3 is described as including security camera footage, embodiments of the present disclosure are not so limited. For example, video data 102-3 can include any other type of video data that may be relevant to an incident.

Audio data 102-4 can include recorded audio data relating to an incident. For example, audio data 102-4 can include recorded audio of phone calls of cardholders associated with the incident (e.g., cardholder data 102-5, as will be further described herein). As another example, audio data 102-4 can include recorded radio communications of cardholders associated with the incident.

Audio data 102-4 can be imported from a building management system that can include recordings of phone calls and/or radio communications of cardholders associated with an incident. For example, importing recordings of phone calls and/or radio communications can include trimming the length of the recordings so as to detail an incident and/or events relevant to (e.g., events leading up to, and/or events caused by) the incident.

Although importing audio data 102-4 is described being imported from a building management system, embodiments of the present disclosure are not so limited. For example, audio data 102-4 can be imported from any other type of source. Additionally, although audio data 102-4 is described as including phone calls of and radio communications of cardholders, embodiments of the present disclosure are not so limited. For example, audio data 102-4 can include any other type of audio data that may be relevant to an incident.

Cardholder data 102-5 can include persons relating to an incident. For example, cardholder data 102-5 can include first responders who may be responding to an incident. As another example, cardholder data 102-5 can include investigators and/or law enforcement personnel involved with an incident investigation. However, embodiments of the present disclosure are not so limited. For example, cardholder data 102-5 can include any person involved with the incident.

Cardholder data 102-5 can also include identifying information for each cardholder. For example, a cardholder can be associated with identifying information such as the cardholder's name, date of birth, physical characteristics of the cardholder, employer, work and/or home address, and/or any other information that may be relevant as identifying information for a cardholder.

Cardholder data 102-5 can further include a record of response times and actions taken in response to the incident by one or more cardholders associated with the incident. For example, the actions taken by a cardholder in response to an incident can be logged.

Additionally, the time taken by a cardholder to respond to the incident and/or the time taken to complete each action can be logged. For example, global positioning system (GPS) locations of cardholders can be used to determine response times and/or completion times of actions in response to an incident.

In some embodiments, an incident may have a predetermined course of steps to be taken by a cardholder in response to the incident. The identity of the cardholder responding to the incident can be logged, as well as the steps taken by the cardholder and/or the time taken to complete each step.

Cardholder data 102-5 can be imported from a building management system that can include occupancy information. For example, importing occupancy information can include importing data associated with visitors, employees, and/or any other person occupying the building. Importing occupancy information can include importing occupancy data of persons within the building at the time an incident occurred.

Although importing cardholder data 102-5 is described as being imported from a building management system, embodiments of the present disclosure are not so limited. For example, cardholder data 102-5 can be imported from any other type of source.

Incident detail data 102-6 can include a timeline of the incident (e.g., timeline 204 as described in connection with FIG. 2), a report of the incident, and/or a damage assessment of the incident. For example, a report of the incident can include information such as what type of incident has occurred, when the incident occurred, as well as actions taken in response to the incident.

Incident detail data 102-6 can include a damage assessment of the incident. For example, after a fire, portions of a building may be in need of repair or destroyed. The damage assessment of the incident can document items that have been damaged as a result of the incident and that may need to be repaired or replaced.

Although data associated with an incident included in incident dossier 100 is described in connection to FIG. 1 as including alarm data 102-1, social media data 102-2, video data 102-3, audio data 102-4, cardholder data 102-5, and incident detail data 102-6, embodiments of the present disclosure are not so limited. For example, data included in incident dossier 100 can be any other data that may be relevant to an incident, and may be in any other form.

Incident dossier 100 can also be generated using one or more user inputs associated with the incident. As used herein, a user input associated with an incident can include a time range describing when an incident occurred, a selection of a video feed related to an incident, a selection of a radio communication related to an incident, and/or one or more cardholders associated with an incident. However, embodiments of the present disclosure are not so limited. For example, a user input can be any other input associated with an incident.

The user input associated with an incident can be received from a user. As used herein, a user can be a person associated with incident investigation. For example, a user can be a person associated with a municipal, state, or federal agency (e.g., police, fire, and/or other investigatory group). As another example, a user can be an operator of a building management system.

In some embodiments, incident dossier 100 can be a custom incident dossier based on a custom data selection received from a user. The custom incident dossier can be generated by the user manually associating data with an incident for use in incident dossier 100 by preferentially selecting data that the user believes might be relevant to the incident. For example, the computing device (e.g., computing device 530, as described in connection with FIG. 5) can suggest appropriate data for the user to associate with the incident. In another example, the user can select data for use in incident dossier 100 without help from the computing device.

Incident dossier 100 can be generated based on data associated with multiple incidents. For example, a first incident (e.g., a water pipe bursting) may lead to a second incident (e.g., a person slipping and falling). Incident dossier 100 can be generated based on data associated with the first and the second incident. As another example, incident dossier 100 can be generated based on data associated with more than two incidents.

Incident dossier 100 can be adjusted based on an additional user input. For example, an alarm included in alarm data 102-1 may not be relevant to the incident. A user can remove the irrelevant alarm from incident dossier 100 so it is not considered in the report of the incident and/or the damage assessment of the incident. As another example, a user can add data associated with (e.g., relevant to) an incident to incident dossier 100 that was not originally included at the time incident dossier 100 was generated.

In some embodiments, incident dossier 100 can be adjusted based on a privilege level of the user. For instance, a user can adjust (e.g., add data, remove data, etc.) incident dossier 100 only if the user possesses a privilege level granting the user the ability to do so. For example, a user attempting to remove data from incident dossier 100 without the proper privilege level will not be allowed to do so.

A computing device (e.g., computing device 530 as described in connection with FIG. 5), can generate a number of invoices based on the damage assessment of the incident. For example, if an incident results in damage to the building, the computing device can further utilize the damage assessment of the incident to generate a number of invoices that can detail the cost of repairing the damage caused by the incident.

In some embodiments, incident dossier 100 can be displayed sequentially. For example, incident dossier 100 can display the data associated with the incident in a chronological order. Displaying the data associated with the incident in chronological order can assist a user to better understand the sequence of events that may have led to an incident occurring. For example, a user may find an incident relating to an injurious slip and fall easier to understand by observing events leading up to the incident. As an additional example, a user may better understand any incidents occurring after the injurious slip and fall that may be a result of the injurious slip and fall.

In some embodiments, incident dossier 100 can be displayed non-sequentially. For example, incident dossier 100 can display the data associated with an incident in a non-chronological order. Displaying the data associated with an incident in a non-chronological order can help a user to better understand an incident that resulted from a large and/or complex number of events. For example, a user may find an incident that has occurred easier to understand by observing events surrounding the incident in a non-sequential manner to separate events not causally related to the incident from events that may have caused the incident.

Figure 2:
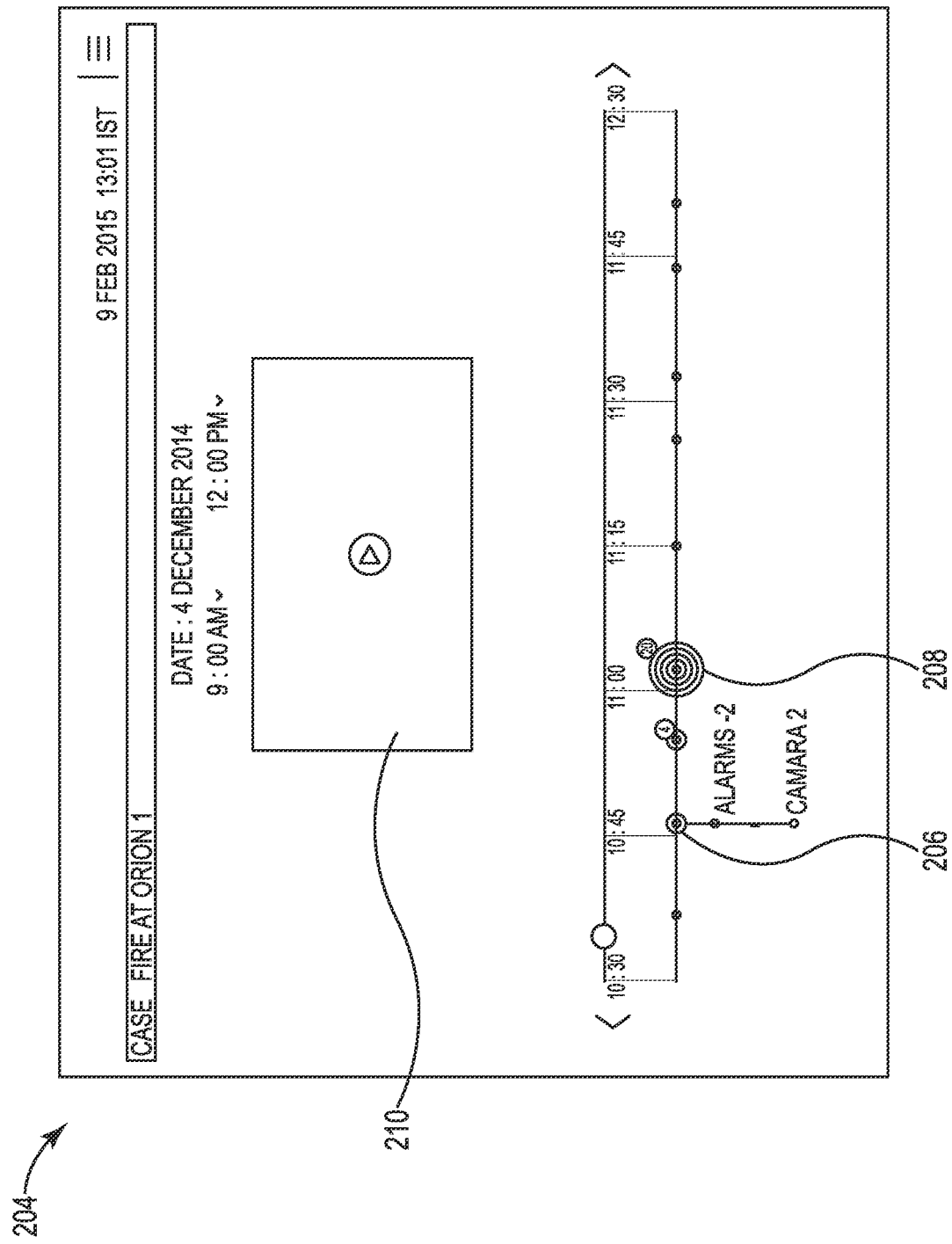
FIG. 2 is an illustration of a display on a user interface showing an incident dossier timeline, generated in accordance with one or more embodiments of the present disclosure.

FIG. 2 is an illustration of a display on a user interface (e.g., user interface 536, as described in connection with FIG. 5) showing an incident dossier timeline 204, generated in accordance with one or more embodiments of the present disclosure. As shown in FIG. 2, the incident dossier timeline 204 can include critical section indicators (e.g., minor incident indicator 206 and major incident indicator 208, as will be further described herein) and synchronous playback 210.

Generating an incident dossier (e.g., incident dossier 100 as described in connection with FIG. 1) can include generating, by a computing device (e.g., computing device 530 as described in connection with FIG. 5), a timeline 204 of the incident. For instance, timeline 204 may be included in incident detail data 102-6 of incident dossier 100. A timeline, as used herein, is a display of a list of events and/or incidents in chronological order. For example, as shown in FIG. 2, timeline 204 can display a time range of between 9:00 AM and 12:00 PM. Timeline 204 can further display all the events and/or incidents that occurred between the time range of 9:00 AM and 12:00 PM, in chronological order.

The time range of timeline 204 can vary based on a user input (e.g., one or more user inputs as described in connection with FIG. 1). For example, a user can select a time range of between 8:00 AM and 5:00 PM. As another example, a user can select a time range of between 9:00 AM and 10:00 AM.

Although the time range of timeline 204 is described as being specified on the hour (e.g., 9:00 AM, 10:00 AM, etc.), embodiments of the present disclosure are not so limited. For example, the time range of timeline 204 can be specified to a selected minute and/or second (e.g., 9:01 AM to 2:35 PM, 9:01:30 AM to 11:32:45 AM, etc.).

Generating an incident dossier (e.g., incident dossier 100 as described in connection with FIG. 1) can include determining, by a computing device, a critical section on the timeline 204 of the incident. Determining a critical section can include analyzing, based on the number of user inputs, a number of events that comprise an incident for instances when a number of events exceeds a threshold number of events. For example, if an incident (e.g., a fire) includes five separate events (e.g., fire alarms, smoke alarms, etc.), and the threshold number of events is three, the incident is determined to be a critical section on timeline 204.

In some embodiments, a threshold number of events can be user specified. For example, a user can manually specify a number of threshold events (e.g., five) to determine a critical section. The user can specify a global threshold (e.g., a threshold applying to all types of incidents), and/or specify a threshold specific to the type of incident (e.g., a first threshold applying to incidents relating to fire, a second threshold applying to incidents relating to burglary, a third threshold to incidents relating to injuries, etc.).

In some embodiments, a threshold number of events can be automatically specified by a computing device (e.g., computing device 530 as described in connection with FIG. 5). For example, the computing device can automatically specify a threshold number of events (e.g., five) to determine a critical section. The computing device can specify a global threshold (e.g., a threshold applying to all types of incidents), and/or specify a threshold specific to the type of incident (e.g., a first threshold applying to incidents relating to fire, a second threshold applying to incidents relating to burglary, a third threshold to incidents relating to injuries, etc.).

As shown in FIG. 2, the timeline 204 can include one or more critical section indicators (e.g., minor incident indicator 206 and major incident indicator 208) that can provide a user with data associated with a critical section. A user can interact with a critical section indicator by clicking on the indicator. For example, as shown in FIG. 2, clicking minor incident indicator 206 can reveal to the user the events associated with the incident (e.g., two alarms and video data from two cameras). Further, clicking on an individual event associated with the incident (e.g., video data from one of the two cameras) can allow the user to view information about that event.

Determining a critical section on timeline 204 can include indicating major incidents on the timeline. For example, major incident indicator 208 can indicate a major incident. A major incident can include an incident with a number of events that exceeds a threshold number of events (e.g., a critical section) and also reaches a severe threat level by exceeding a further threshold number of events. For example, a major incident can include ten events, exceeding a threshold number of events (e.g., three) so as to be a critical section, and exceeding a further threshold number of events (e.g., seven), so as to obtain a severe threat level and be indicated as a major incident.

In some embodiments, a major incident can be determined by the type of incident. For example, an incident relating to a fire can be indicated as a major incident. As an additional example, an incident relating to a terrorist attack can be indicated as a major incident.

Determining a critical section on timeline 204 can include indicating minor incidents on the timeline. For example, minor incident indicator 206 can indicate a minor incident. A minor incident can include an incident with a number of events that exceeds a threshold number of events (e.g., a critical section) but does not reach a severe threat level by exceeding a further threshold number of events. For example, a minor incident can include five events, exceeding a threshold number of events (e.g., three) so as to be a critical section, but not exceeding a further threshold number of events (e.g., seven), so as to be indicated as a minor incident with a non-severe threat level.

In some embodiments, a minor incident can be determined by the type of incident. For example, an incident relating to a slip and fall injury can be indicated as a minor incident. As an additional example, an incident relating to a burglary can be indicated as a minor incident.

Once a critical section has been determined on timeline 204, a user can be notified that the critical section has been determined. For example, a user can be notified of a critical section via a prompt, audio cue, or any other notification to obtain the user's attention.

Although not shown in FIG. 2 for clarity and so as not to obscure embodiments of the present disclosure, timeline 204 can include a damage assessment of an incident (e.g., as described in connection with FIG. 1). For example, a critical section on timeline 204 relating to an incident (e.g., a fire) can include the damage assessment associated with the incident.

In some embodiments, timeline 204 can include a number of invoices associated with an incident (e.g., as described in connection with FIG. 1). For example, a critical section on timeline 204 relating to an incident (e.g., a fire) can include a number of invoices generated based on a damage assessment of the incident.

As shown in FIG. 2, the timeline 204 can include a synchronous playback 210 of the incident. For example, a user can view a synchronous playback of events as they occurred through synchronous playback 210. Synchronous playback 210 can include data associated with an incident (e.g., alarm data 102-1, social media data 102-2, video data 102-3, audio data 102-4, cardholder data 102-5, and incident detail data 102-6, as described in connection with FIG. 1), or any other data associated with an incident.

Synchronous playback 210 can occur at a speed specified by a user. For example, the user can specify the speed (e.g., 0.5×, 1×, 2×, etc.) at which synchronous playback 210 occurs. Further, the user can stop, rewind, or skip ahead and/or behind the current playback position of synchronous playback 210.

Figure 3:
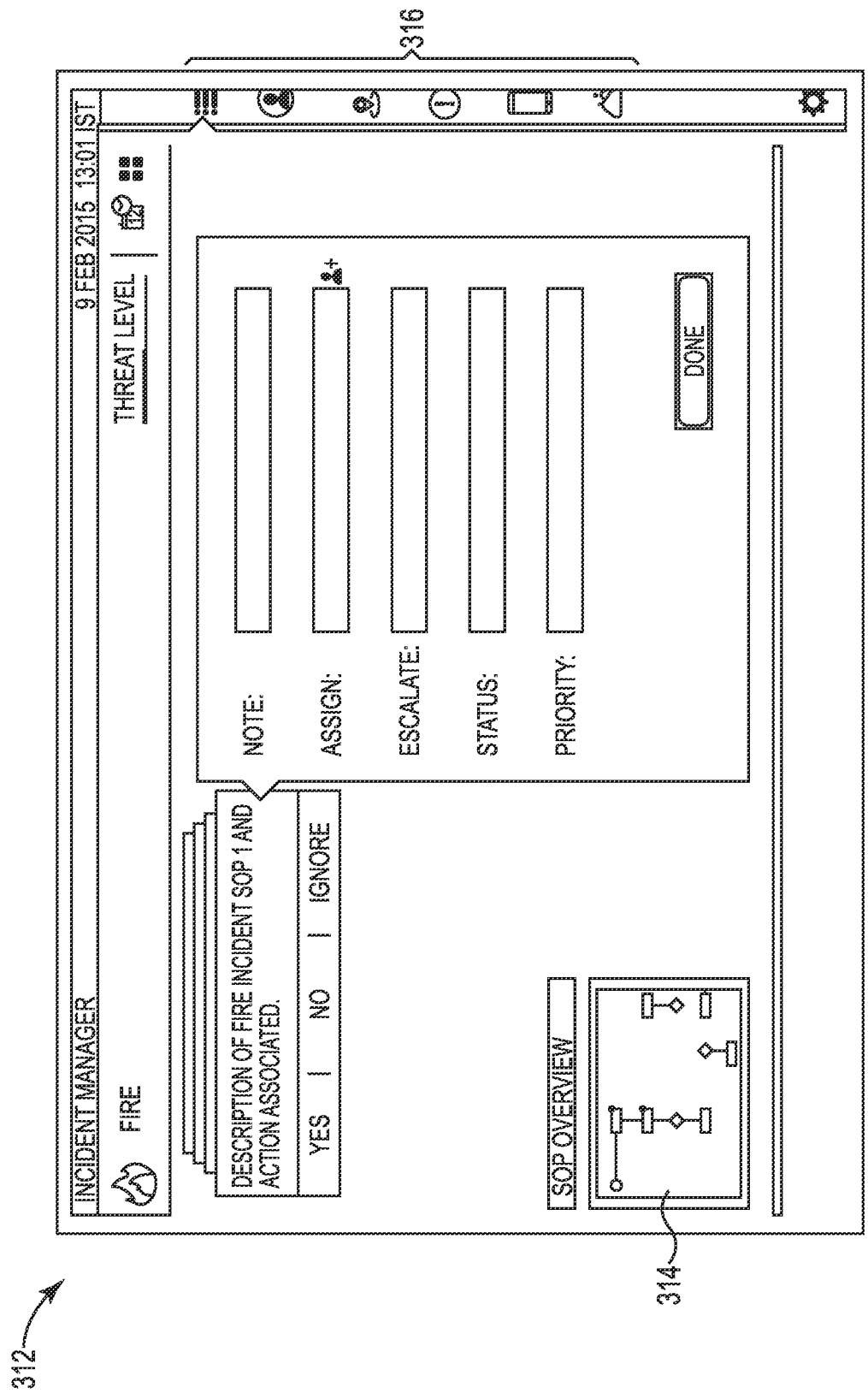
FIG. 3 is an illustration of a display on a user interface showing a workflow review, generated in accordance with one or more embodiments of the present disclosure.

FIG. 3 is an illustration of a display on a user interface (e.g., user interface 536, as described in connection with FIG. 5) showing a workflow review 312, generated in accordance with one or more embodiments of the present disclosure. As shown in FIG. 3, the workflow review 312 can include cardholder response 314 and review tools 316.

As shown in FIG. 3, workflow review 312 can display a record of response times and actions in response to the incident taken by the one or more cardholders associated with the incident. For instance, cardholder response 314 can illustrate the steps taken by a cardholder in response to an incident. For example, in response to a fire, a cardholder can have a predetermined course of steps to take in response to the fire. Cardholder response 314 can illustrate the individual steps the cardholder took in response to the fire, as well as the time taken at each step.

As shown in FIG. 3, workflow review 312 can include review tools 316. For example, review tools 316 can include tools to review additional cardholder responses to an incident, locations and/or routes taken by cardholders in response to an incident, communications of cardholders in response to an incident, and/or other review tools.

Figure 4:
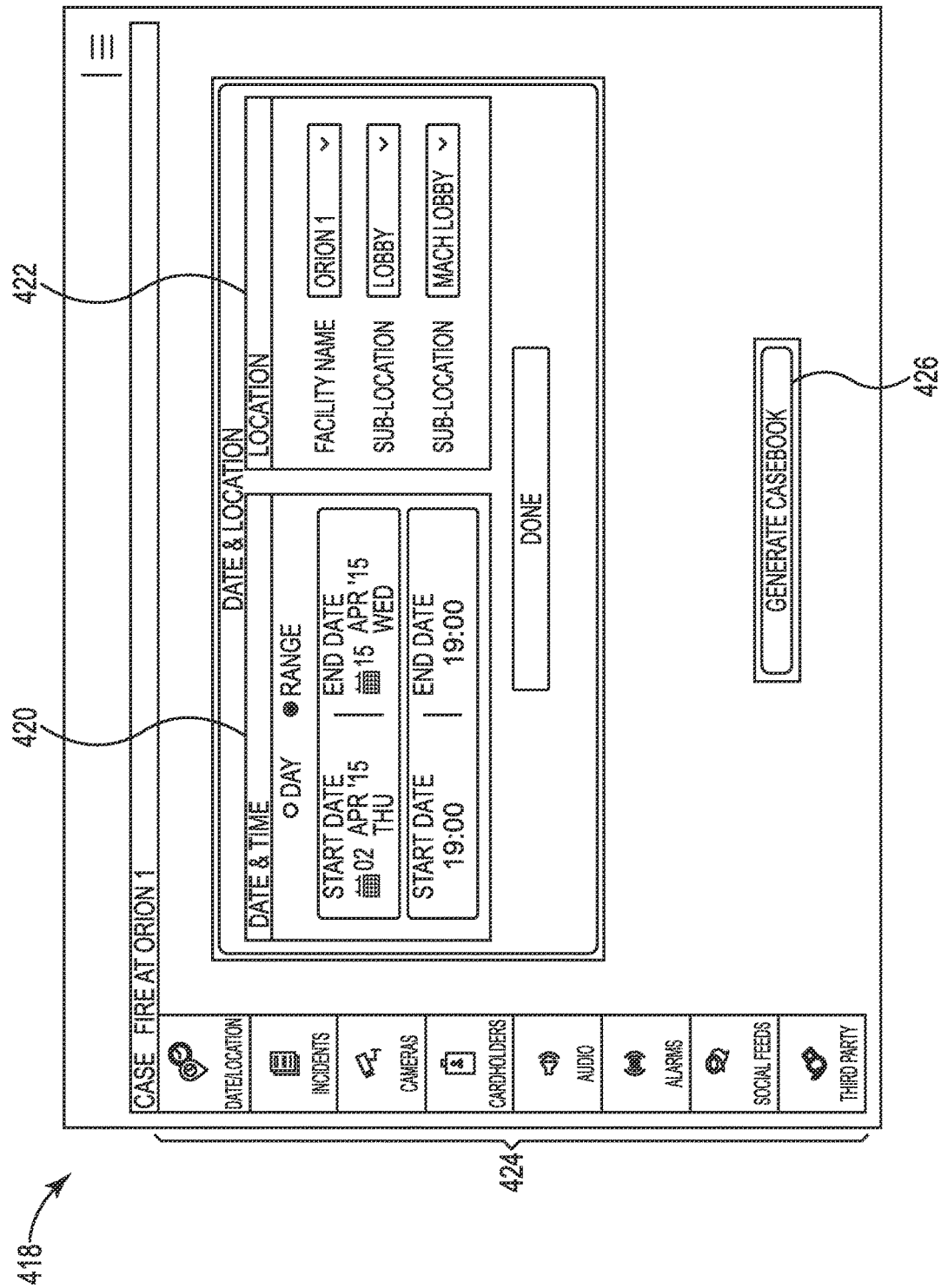
FIG. 4 is an illustration of a display on a user interface showing an incident dossier search, in accordance with one or more embodiments of the present disclosure.

FIG. 4 is an illustration of a display on a user interface (e.g., user interface 536, as described in connection with FIG. 5) showing an incident dossier search 418, in accordance with one or more embodiments of the present disclosure. As shown in FIG. 4, the incident dossier search 418 can include a date and time search 420, location filter 422, search tools 424, and casebook generator 426.

A user can utilize date and time search 420 to search for a previously created incident dossier by inputting a date and time search query into date and time search 420. For example a user, in response to a burglary, can search for an incident dossier previously created in response to a previous break in by specifying a date and time in date and time search 420 that the user believes the burglary occurred. As another example, the user can search for an incident dossier by specifying a date and time range for date and time search 420.

As an additional example, a user can specify a facility name in location filter 422. Additionally, the user can specify sub-locations within a facility via location filter 422. For example, a user can search for incidents occurring in a specific location (e.g., a storage room located in a large manufacturing plant) by specifying that location via location filter 422. Specifying a location can narrow search results in a system with multiple locations and/or many incidents.

Search tools 424 can be used to further specify search results. For example, a user can search for previously created incident dossiers by searching known previous incidents that have occurred, video data (e.g., security camera footage), cardholders, audio data (e.g., radio communications), alarms, social media data, or any other type of data associated with an incident.

Although not shown in FIG. 4 for clarity and so as not to obscure embodiments of the present disclosure, a user can search for a previously created incident dossier based on an event timeline. An event timeline can include a number of incidents associated with a site, where each incident includes a number of events. The number of events comprising each respective incident can indicate a severity level of that respective incident.

The severity level of each respective incident can be indicated on an event timeline (e.g., minor incident indicator 206 and major incident indicator 208, as described in connection with FIG. 2). The more severe incidents can be indicated on the timeline by using a larger indicator. A user can utilize the size of the indicators on the timeline to search for a particular incident.

Generating an incident dossier (e.g., incident dossier 100 as described in connection with FIG. 1) can include generating and exporting, by a computing device (e.g., computing device 530 as described in connection with FIG. 5), a casebook of the incident by using casebook generator 426. A casebook of the incident can include the incident dossier detailing what incident occurred, when the incident occurred, how the incident was responded to, and a number of invoices (e.g., invoices generated based on the damage assessment of the incident, as described in connection with FIG. 1), detailing any resulting damages from the incident.

Generating an incident dossier can include generating and exporting a casebook including a previously generated incident dossier. For example, an incident dossier found using date and time search 420 can be exported as a casebook using casebook generator 426. A casebook of a previously generated incident dossier can include details describing what incident occurred, when the incident occurred, how the incident was responded to, and a number of invoices detailing any resulting damages from the previous incident.

FIG. 5 is a system 528 for generating an incident dossier, in accordance with one or more embodiments of the present disclosure. As shown in FIG. 5, system 528 can include a computing device 530. Computing device 530 can include a memory 534 and a processor 532 configured generate an incident dossier in accordance with the present disclosure.

The memory 534 can be any type of storage medium that can be accessed by the processor 532 to perform various examples of the present disclosure. For example, the memory 534 can be a non-transitory computer readable medium having computer readable instructions (e.g., computer program instructions) stored thereon that are executable by the processor 532 to generate an incident dossier in accordance with the present disclosure. Further, processor 532 can execute the executable instructions stored in memory 534 to generate an incident dossier in accordance with the present disclosure.

The memory 534 can be volatile or nonvolatile memory. The memory 534 can also be removable (e.g., portable) memory, or non-removable (e.g., internal) memory. For example, the memory 534 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 534 is illustrated as being located within computing device 530, embodiments of the present disclosure are not so limited. For example, memory 534 can also be located internal to another computing resource (e.g., enabling computer readable instructions to be downloaded over the Internet or another wired or wireless connection).

As shown in FIG. 5, computing device 530 includes a user interface 536. A user (e.g., operator) of computing device 530 can interact with computing device 530 via user interface 536. For example, user interface 536 can provide (e.g., display and/or present) information to the user of computing device 530, and/or receive information from (e.g., input by) the user of computing device 530. For instance, in some embodiments, user interface 536 can be a graphical user interface (GUI) that can include a display (e.g., a screen) that can provide and/or receive information to and/or from the user of computing device 530. The display can be, for instance, a touch-screen (e.g., the GUI can include touch-screen capabilities). Alternatively, a display can include a television, computer monitor, mobile device screen, or other type of display device connected to computing device 530 and configured to receive a video signal output from the computing device 530.

As an additional example, user interface 536 can include a keyboard and/or mouse the user can use to input information into computing device 530. Embodiments of the present disclosure, however, are not limited to a particular type(s) of user interface.

As shown in FIG. 5, computing device 530 can import incident data 538 and receive a number of user inputs via user interface 536. Computing device 530 can further generate an incident dossier, including a timeline of an incident, a critical section indicated on the timeline, a report of the incident, and a damage assessment of the incident, to display to a user via user interface 536. Further, computing device 530 can export casebook 540 including the incident dossier and a number of invoices based on the damage assessment of the incident for use by the user of computing device 530 and/or another user.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device for generating an incident dossier, comprising:
a memory;
a processor configured to execute executable instructions stored in the memory to:
import data associated with an incident associated with a site, wherein the data is in a number of different forms;
receive a number of user inputs associated with the incident including a selection of a time range of the incident;
generate a timeline including a time at which the incident occurs;
determine a critical section on the timeline by determining, based on the number of user inputs, that a number of events that comprise the incident exceeds a threshold number of events;
determine, in response to the number of events that comprise the incident exceeding the threshold number of events, whether the number of events that comprise the incident exceed a further threshold number of events;
classify the incident as a minor incident in response to the number of events that comprise the incident exceeding the threshold number of events but not the further threshold number of events; and
classify the incident as a major incident in response to the number of events that comprise the incident exceeding the threshold number of events and the further threshold number of events;
generate an incident dossier based on the data associated with the incident and the number of user inputs, wherein the incident dossier includes:
the timeline;
an indicator on the timeline, wherein the indicator:
is located at the critical section on the timeline;
indicates, based on a size of the indicator, whether the incident is classified as a minor incident or a major incident; and
is selectable to display further data associated with the critical section on the timeline, wherein the further data comprises one or more events associated with the incident; and
a report of the incident; and
a user interface configured to display the incident dossier, including the further data associated with the critical section on the timeline in response to a selection of the indicator.

2. The computing device of claim 1, wherein the incident dossier further includes a damage assessment of the incident, and the processor is configured to execute the instructions to generate a number of invoices based on the damage assessment of the incident.

3. The computing device of claim 1, wherein the incident dossier is a custom incident dossier based on a custom data selection received from the user.

4. The computing device of claim 1, wherein the incident dossier further includes a record of response times and actions in response to the incident taken by one or more cardholders associated with the incident.

5. The computing device of claim 4, wherein the processor is configured to execute the instructions to display the record of response times and actions in response to the incident taken by the one or more cardholders associated with the incident in a workflow review.

6. The computing device of claim 1, wherein the processor is configured to execute the instructions to display the incident dossier sequentially in time.

7. The computing device of claim 1, wherein the processor is configured to execute the instructions to display the incident dossier non-sequentially in time.

8. A computer implemented method for generating an incident dossier, comprising:
  importing, by a computing device, data associated with an incident associated with a site, wherein the data is in a number of different forms;
  receiving, from a user of the computing device, a number of user inputs associated with the incident including a selection of a time range that includes the incident;
  generating, by the computing device, a timeline that covers a time at which the incident occurred;
  determining, by the computing device, a critical section on the timeline by determining, based on the number of user inputs, that a number of events that comprise the incident exceeds a threshold number of events;
  determining, by the computing device in response to the number of events that comprise the incident exceeding the threshold number of events, whether the number of events that comprise the incident exceed a further threshold number of events;
  classifying, by the computing device, the incident as a minor incident in response to the number of events that comprise the incident exceeding the threshold number of events but not the further threshold number of events;
  classifying, by the computing device, the incident as a major incident in response to the number of events that comprise the incident exceeding the threshold number of events and the further threshold number of events; and
  generating, by the computing device, an incident dossier based on the data associated with the incident and the number of user inputs, wherein the incident dossier includes:
    the timeline;
    an indication of the critical section on the timeline;
    an indicator on the timeline, wherein the indicator:
      is located at the critical section on the timeline;
      indicates, based on a size of the indicator, whether the incident is classified as a minor incident or a major incident; and
      is selectable to display further data associated with the critical section on the timeline, wherein the further data comprises one or more events associated with the incident; and
    a report of the incident.

9. The method of claim 8, wherein the incident is classified as a major incident in response to the number of events that comprise the incident including a number of events with a severe threat level.

10. The method of claim 8, wherein the incident is classified as a minor incident in response to the number of events that comprise the incident including a number of events with a non-severe threat level.

11. The method of claim 8, wherein the method includes notifying the user the critical section has been determined.

12. A non-transitory computer readable medium having computer readable instructions stored thereon that are executable by a processor to:
  import data associated with an incident associated with a site, wherein the data is in a number of different forms;
  receive, from a user, a number of user inputs associated with the incident, wherein the number of user inputs are in a number of different forms and include a selection of a time range of the incident;
  generate a timeline including at time at which the incident occurs;
  determine a critical section on the timeline by determining, based on the number of user inputs, that a number of events that comprise the incident exceeds a threshold number of events;
  determine, in response to the number of events that comprise the incident exceeding the threshold number of events, whether the number of events that comprise the incident exceed a further threshold number of events;
  classify the incident as a minor incident in response to the number of events that comprise the incident exceeding the threshold number of events; and
  classify the incident as a major incident in response to the number of events that comprise the incident exceeding the threshold number of events and the further threshold number of events;
  generate an incident dossier based on the data associated with the incident and the number of user inputs, wherein the incident dossier includes:
    the timeline;
    an indicator on the timeline, where the indicator:
      is located at the critical section on the timeline; and
      indicates, based on a size of an icon indicating the critical section on the timeline, whether the incident is classified as a minor incident or a major incident; and
  display the incident dossier on a user interface; and
  at or adjacent to the timeline, display further data associated with the critical section on the timeline in response to receiving a selection of the indicator by a user, wherein the further data comprises one or more events associated with the incident.

13. The non-transitory computer readable medium of claim 12, wherein the computer readable instructions are executable by the processor to adjust the incident dossier based on an additional user input.

14. The non-transitory computer readable medium of claim 12, wherein the computer readable instructions are executable by the processor to adjust the incident dossier based on a privilege level of the user.

15. The non-transitory computer readable medium of claim 12, wherein the computer readable instructions are executable by the processor to search for a previously created incident dossier based on a date and time search query.

16. The non-transitory computer readable medium of claim 12, wherein the computer readable instructions are executable by the processor to search for a previously created incident dossier based on an event timeline, wherein the event timeline includes:
  a number of incidents associated with the site, wherein each of the number of incidents includes a number of events;
  wherein the number of events of each respective number of incidents indicates a severity level of that respective incident.

17. The non-transitory computer readable medium of claim 12, wherein the computer readable instructions are executable by the processor to export an additional casebook, wherein the additional casebook includes a previously generated incident dossier, and a number of invoices based on a damage assessment of a previous incident.

* * * * *